April 24, 1951 F. P. GOHOREL 2,549,803

TRANSMISSION SYSTEM FOR CONTROLS AND SIGNALS FOR TOLL OR LONG DISTANCE TELEPHONE CIRCUITS

Filed Aug. 5, 1947 2 Sheets-Sheet 1

INVENTOR
FERNAND P. GOHOREL
BY Robert Harding Jr.
ATTORNEY

April 24, 1951 F. P. GOHOREL 2,549,803

TRANSMISSION SYSTEM FOR CONTROLS AND SIGNALS FOR TOLL OR LONG DISTANCE TELEPHONE CIRCUITS

Filed Aug. 5, 1947 2 Sheets-Sheet 2

INVENTOR
FERNAND P. GOHOREL

BY Robert Harding Jr.
ATTORNEY

Patented Apr. 24, 1951 2,549,803

UNITED STATES PATENT OFFICE 2,549,803

TRANSMISSION SYSTEM FOR CONTROLS AND SIGNALS FOR TOLL OR LONG DISTANCE TELEPHONE CIRCUITS

Fernand P. Gohorel, Antony, France, assignor to International Standard Electric Corporation, New York, N. Y., a corporation of Delaware Application August 5, 1947, Serial No. 766,422
In France December 20, 1945

Section 1, Public Law 690, August 8, 1946
Patent expires December 20, 1965

12 Claims. (Cl. 179—1)

This invention relates to a transmission system for controls and signals for toll telephone circuits.

The use of voice frequency currents for the purpose of transmitting control and signal impulses between exchanges or central offices in automatic switching toll telephone systems has already been proposed. This method offers advantages, particularly in cases where the central offices are connected by Pupin coil loaded circuits comprising repeater stations or not. This ensures minimum damping in the course of transmission and maximum amplification while passing through the repeater stations. However, this utilization requires special arrangements to make it impossible for the conversation currents to cause false controls or signals. Various solutions have been offered to prevent this unwanted action of the conversation currents but they are fraught with a multiplicity of drawbacks in actual circuit operation, even when the use of multiple frequency currents is provided.

The object of this invention is a system which, by simple and efficacious means, allows of transmission or retransmission of controls or signals while at the same time ruling out any possibility of an unwanted action of the conversation currents.

One of the characteristics of the invention will be found in the fact that the controls or signals are transmitted by signals at a frequency $f$, comprised within the voice frequency band, use being made of a common device for the reception and transmission of the signals, means being provided for the currents having frequencies different from $f$ to be made unable to act on said devices.

Another characteristic of the invention will be found in the fact that the detector oscillator device connected to the parallel circuit comprises elements which are used for both detector and oscillator functions, said device normally being in the detector condition and its changeover to the oscillator condition being made dependent on the equipment of the central office with which it is associated.

Another characteristic of the invention is to be found in the fact that, when the detector-oscillator device is placed in the oscillator condition, the band pass filter of the parallel circuit to which it is connected is eliminated in order to remove the attenuation which it would cause in the transmission of the signal.

In cases where a connection is completed between one central office and another one over one or several intermediate central offices, it may be of value, in order to increase the speed of operation, not to have each intermediate central office retransmit the control or signal impulses.

Another characteristic yet of the invention will be found in the fact that, when a call is routed through a central office, the band rejection filters placed before and after said central office are eliminated and a single one of the parallel circuits is kept operative in order to receive the releasing or supervisory signal.

The principles on which this invention rests will be made clear by the following description, given below as a non-restrictive example and read in connection with the accompanying drawings in which.

Figure 1:
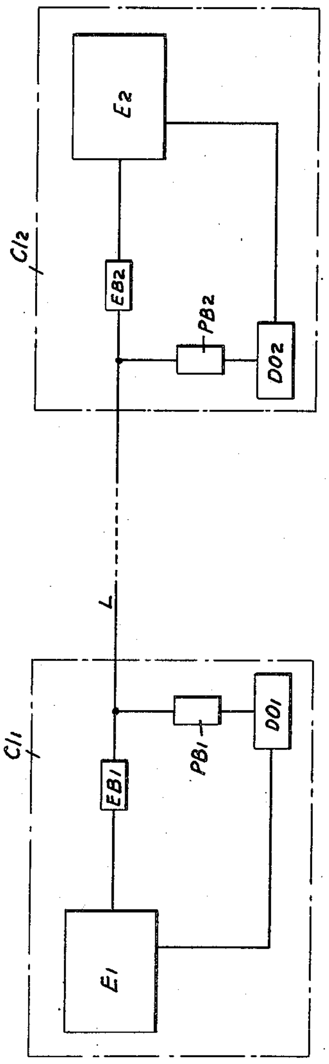
Figure 1 is a diagrammatic showing of two connected long distance central offices.

Figure 1 shows two toll or long distance central offices $CI_1$ and $CI_2$, connected by a circuit L. At central office $CI_1$, circuit L is connected, on the one hand, to a band rejecting filter $EB_1$ and, on the other hand, to band pass filter $PB_1$ of the parallel circuit, connected to detector oscillator $DO_1$. In central office $CI_2$, circuit L is connected, in a similar fashion, to $EB_2$ and $PB_2$.

A frequency $f$, located within the voice-frequency band, say 2,000 C. P. S., is chosen for the control and signaling impulses. In this case, band rejecting filters $EB_1$ and $EB_2$ are so designed as not to pass the 2,000 C. P. S. frequency. Conversely, band pass filters $PB_1$ and $PB_2$ pass only said frequency.

Normally, when no control or signal is sent out from a central office, the detector-oscillator device associated with it is in its detector condition.

It will now be assumed that a signal or control has to be sent from central office $CI_1$ to central office $CI_2$. Once the various operations that are characteristic of the signal to be sent out have been carried out in equipment $E_1$ of $CI_1$, said equipment acts on $DO_1$ and thus causes it to change over to its oscillator condition. Under the control of $E_1$, the oscillator is connected to the parallel circuit and an alternating current impulse at a 2,000 C. P. S. frequency is sent out over circuit L. Said impulse is received, through $PB_2$ in $DO_2$ of $CI_2$ and retransmitted to equipment $E_2$ in the form of a direct current impulse.

At the end of the transmission of the signal, equipment $E_1$ causes $DO_1$ to revert to its detector condition.

The signals sent out from $CI_2$ to $CI_1$ are transmitted and received in similar fashion.

When the conversation currents are received, either in $E_1$ or $E_2$, they are sent over line L through filters $EB_1$ or $EB_2$. Under such conditions, the 2,000 C. P. S. signaling frequency will be blocked and not transmitted over line L. The conversation currents other than that at 2,000 C. P. S. can not be received in $DO_1$ or $DO_2$ due to the presence of filters $PB_1$ and $PB_2$. As a consequence of this, all possibility, on the part of the conversation currents, to exert an action on detectors $DO_1$ and $DO_2$ is rigidly ruled out.

The directing or positioning impulses, then may be transmitted from one central office to the other in the form of 2,000 C. P. S. signals, according to the process which has been described above.

Figure 2:
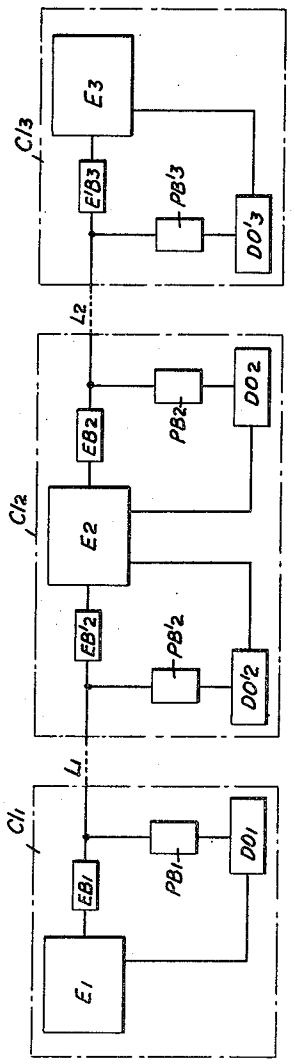
Figure 2 is a similar diagram showing two terminal central offices and an intermediate central office.

Figure 2 shows two terminal central offices $CI_1$ and $CI_3$, as well as an intermediate central office $CI_2$. This intermediate central office comprises, on either side of equipment $E_2$, the band rejecting filters $EB'_2$ and $EB_2$ and the parallel circuits connected to detector-oscillators $DO'_2$ and $DO_2$ through band pass filters $PB'_2$ and $PB_2$.

For the case in which a connection has to be completed between central offices $CI_1$ and $CI_3$, the signals sent out by $DO_1$ or $DO'_3$ will be received at $DO'_2$ or $DO_2$ and thus must be retransmitted by these last two mentioned detector-oscillators, unless special arrangements are provided at central office $CI_2$.

In order to accelerate the routing of the calls, a provision may be made for the call to pass through $CI_2$ without being retransmitted.

Once the elements of $E_2$ have been positioned by the signal (*s*) received by $DO'_2$, on line $L_2$, a provision is made, within $E_2$, for operations following said directing, the effect of which is to short out filters $EB'_2$ and $EB_2$ and to open the one or the other of the parallel circuits of $D'O_2$ or $DO_2$. One of the detectors, say $DO'_2$, remains in operation.

The signals sent out by $CI_1$ toward $CI_3$ pass through $CI_2$ without being retransmitted. At the end of the call, when a long releasing signal is sent over the line, it is received in $DO'_2$ and retransmitted in $E_2$, in which it starts the releasing process. Filters $EB'_2$ and $EB_2$ are re-inserted in the lines in series and device $DO_2$ is replaced in the operative condition.

A description will now be given, with reference to Figure 3, of an embodiment of the detector-oscillator. It will be noted that one of the design pecularities is to be found in the use of the same equipment to two different ends, namely the reception and the generation of oscillations at a given frequency *f*.

The change-over from receiver to oscillator operation is effected instantaneously and in a simple manner by the device of keeping the tubes in the same operating conditions.

This process makes it possible to obtain a good stability of operation in spite of the use of limited equipment. The amplification adjustment for one case remains unchanged for the next.

Wires 5, 8, 9, 5', 8', 10', 12' and 11' are connected to equipment E of the toll central office as well as line conductors or wires 3' and 4'.

In order to start the equipment, a negative potential is placed on wire 5' in equipment E. The circuit of the right hand winding of relay

3 is completed and said relay attracts its armature. By way of its work contact 32, it completes the cathode circuit of tubes 46 and 34 as follows: positive battery terminal, left hand winding of relay 3, work contact 32, filament of tubes 46 and 34 and negative battery terminal. The spring of contact 31, associated with relay 3, can complete either the circuit of wire 8', or that of wire 10'. After the equipment is placed in operation, the potential placed, in E, on wire 5', is removed and relay 3 then holds its armature only through its left hand winding. If there is a break in the filament of one of tubes 46 or 34, namely if the equipment is not in a condition to operate, relay 3 drops its armature and, by means of its spring 31 and the associated rest contact, it places a potential on wire 8', which makes it possible to cause, in equipment E, the start of a trouble ring.

Normally, namely when the equipment operates as a detector, relays 1 and 2 are at rest, since there is no potential whatsoever on wires 12' and 11'. Springs 11 to 15, associated with relay 1, close their rest contacts, as well as spring 21, attached to relay 2.

Circuit L is connected, on the one hand, to band rejecting filter EB, made up of the series connected elements 7, 17, 6, 18 and the parallel units 8 and 9. This filter has been so designed as to pass the voice frequency currents to the exception of frequency *f*, chosen for the transmission of controls and signals. Circuit L is connected, on the other hand, to the parallel circuit in which band pass filter PB is provided, a filter which consists of a transformer $T_1$ and units 19, 20, 22, 23. The line conductors 3' and 4' are connected to equipment E.

When a signal at frequency *f* is received over circuit L, it can not pass filter EB but does pass filter PB and is received on potentiometer 25, the midpoint of which drives saturated tube 34. A parallel resonance or anti resonance circuit, made up of elements 36—37 is provided in the plate circuit of said tube, tuned to frequency *f*.

The amplified voltage at the terminals of 36—37 acts through blocking capacitor 40 and potentiometer 42, on the grid of tube 46, which is connected as an amplifier. At the output of said tube, the amplified current is received on the primary of transformer $T_2$. An alternating current thus is received in rectifier 49 and transformed into a direct current which circulates through the winding of relay 4, which then attracts its armature. Relay 4 having moved said armature, spring 41 which is associated thereto opens the circuit made up of wires 5 and 8 and completes the wire 5—wire 9 circuit, which makes it possible to cause, in equipment E, the carrying out of the operations which are to follow reception of the signal. At the end of the reception of said signal, relay 4 drops its armature and spring 41 resumes the position shown on the figure.

It will be noted that, due to the fact that tube 34 is saturated, the current which passes through relay 4 remains essentially constant while the voltage of the signal received may vary between widely separated limits.

Figure 3:
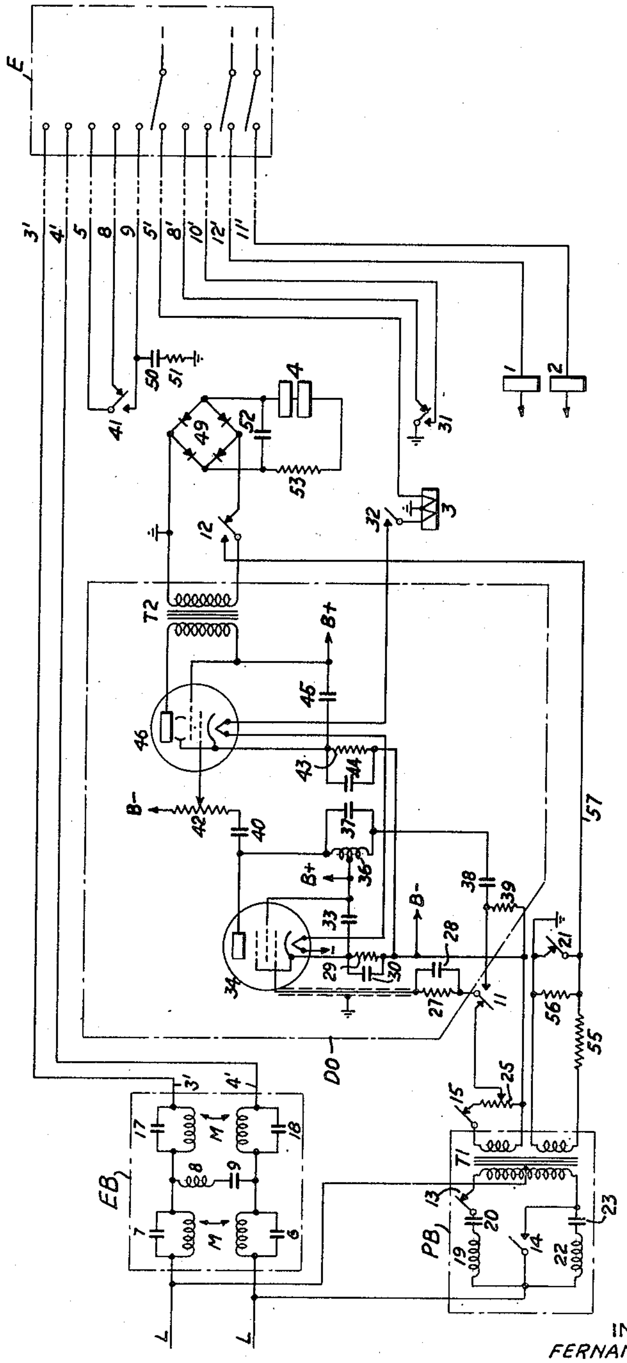
Figure 3 is a circuit diagram of an embodiment of the detector-oscillator as used at an intermediate office.

When a signal must be sent out by the central office with which the equipment of Figure 3 is associated, a negative battery is placed, by equipment E, on wire 12', which causes the armature of relay 1 to be held. The lower right hand winding of transformer $T_1$ is connected by spring 12 of relay 1 and its work contact, to output transformer $T_2$ of amplifier tube 46. The grid of tube 34 is connected, by way of spring 11 of relay 1, to the tuned circuit 36—37. Said tube 34 thus will operate as an oscillator at the frequency of circuit 36—37. The voltage present at the terminals of 36—37 is applied through capacitor 40 and potentiometer 42 to the grid of tube 46.

The current at frequency $f$, amplified by tube 46, finally is received over wire 57. Due to the fact that relay 2 is at rest, its rest contact 21 shorts out the lower right hand winding of transformer $T_1$. Signaling currents at frequency $f$ can not be sent over the line.

When the signal must be sent over the line, a potential is placed, in equipment E, on wire 11', which causes relay 2 to be energized. Rest contact 21 is open and a current at frequency $f$ passes through the lower right hand winding of $T_1$ (the value of resistor 56 is considerable). This current is induced in the left hand winding of $T_1$ and directly transmitted over circuit L, with contact 14 of relay 1 closed and contact 13 open. When transmission of the signal is to cease, the potential is removed from wire 11'. Relay 2 drops its armature and, by way of its contact 21, puts an end to the sending of the signal through the winding of $T_1$.

It will be noted that, during the transmission of a signal, band pass filter PB is eliminated, which makes it possible to reduce the attenuation which it would cause in the transmission of said signal.

Once the transmission of the signal is over, the potential is removed from wire 12'. Relay 1 drops its armature and the equipment is restored to its detector condition.

What is claimed is:

1. In a telephone system having a plurality of offices and interconnecting line circuits, means for transmitting control signals between offices at voice frequency comprising at a station a detector-oscillator device, means normally connecting said device to the line circuit of that office through selective means to receive only the frequency of said control signal, means connecting said office and line circuit for the voice band exclusive of said control signal frequency, and means controlled from said office to cause said device to change over and transmit oscillations at said control signal frequency over said first mentioned connecting means to said line circuit.

2. Signal transmitting means according to claim 1, including a control relay enabling the predetermined operations at said office, and means including a rectifier for coupling the output of said detector-oscillator device to said control relay.

3. Signal transmitting means according to claim 1, in which the selective means in the first mentioned connecting means includes a filter passing the signal control frequency, coupled by a transformer to said detector-oscillator device, said transformer having a pair of windings for transmitting and receiving said frequency and another pair of windings connected to the input and output respectively of said device.

4. Signal transmitting means according to claim 3, wherein the connection between the one secondary and the input of said device is normally closed, and the connection of the other of said pair and the output of said device is normally open.

5. Signal transmitting means according to claim 4, including relay means controlled from said office to effect changeover from reception to transmission of said control signal frequency.

6. Signal transmitting means according to claim 1, including means under control from said office whereby the selective means in said first mentioned connecting means is eliminated during signal transmission from said detector-oscillator.

7. Signal transmitting means according to claim 6, wherein the eliminating means comprises a short circuit of the selective means.

8. Signal transmitting means according to claim 1, wherein said system includes one or more intermediate repeating offices and the latter are each equipped with both said selective means on either side toward a cooperating office.

9. Signal transmitting means according to claim 8, wherein control means at an intermediate office enables direct relaying therethrough of control signal frequencies by elimination of the voice band selective means.

10. Signal transmitting means according to claim 9, including control means for eliminating from the intermediate office the parallel selective means and retaining a single one thereof for the subsequent control of the calling connection.

11. Signal transmitting means according to claim 1, wherein said detector-oscillator device comprises a convertible detector tube having a normally inoperative frequency determining oscillatory circuit, with means for rendering it operative and includes means for maintaining said tube in operating condition.

12. Signal transmitting means according to claim 11, including an amplifier tube coupled to the output of the detector-oscillator tube and means for maintaining both tubes in operating condition.

FERNAND P. GOHOREL.

REFERENCES CITED

The following references are of record in the file of this patent:

UNITED STATES PATENTS

| Number | Name | Date |
|---|---|---|
| 1,711,651 | Pruden | May 7, 1929 |
| 1,958,166 | Laurent | May 8, 1934 |
| 2,020,487 | Wadsworth | Nov. 12, 1935 |
| 2,099,250 | Adler | Nov. 16, 1937 |
| 2,138,613 | Pruden | Nov. 29, 1938 |
| 2,145,053 | Meszar | Jan. 24, 1939 |
| 2,282,131 | Hadfield | May 5, 1942 |
| 2,310,749 | Ressler | Feb. 9, 2943 |
| 2,326,457 | Hadfield | Aug. 10, 1943 |